United States Patent [19]

Shirasu

[11] Patent Number: 4,635,511
[45] Date of Patent: Jan. 13, 1987

[54] CUTTER CONTROL APPARATUS

[75] Inventor: Masanori Shirasu, Hyogo, Japan

[73] Assignee: Mitsubishi Denki Kabushiki Kaisha, Tokyo, Japan

[21] Appl. No.: 668,187

[22] Filed: Nov. 5, 1984

Related U.S. Application Data

[63] Continuation-in-part of Ser. No. 489,292, Apr. 28, 1983, abandoned.

[30] Foreign Application Priority Data

Apr. 29, 1982 [JP] Japan .................................. 57-72979

[51] Int. Cl.$^4$ ...................... B23D 25/12; B23Q 15/08
[52] U.S. Cl. ............................................ 83/71; 83/76; 83/287; 83/522
[58] Field of Search ................ 83/73, 74, 76, 71, 369, 83/287, 522

[56] References Cited

U.S. PATENT DOCUMENTS

| | | | |
|---|---|---|---|
| 3,181,403 | 5/1965 | Sterns | 83/76 |
| 3,355,973 | 12/1967 | Rubinstein | 83/369 X |
| 3,411,388 | 11/1968 | Rappaport | 83/76 |
| 3,628,410 | 12/1971 | Shields | 83/287 |
| 3,668,957 | 6/1972 | Nido | 83/76 X |
| 4,274,317 | 6/1981 | Vulliens | 83/74 |
| 4,384,500 | 5/1983 | Friberg | 83/74 |
| 4,464,959 | 8/1984 | Larson | 83/76 |

FOREIGN PATENT DOCUMENTS 197709  2/1977  U.S.S.R. ................................ 83/73

Primary Examiner—James M. Meister
Attorney, Agent, or Firm—Sughrue, Mion, Zinn Macpeak & Seas

[57] ABSTRACT

A correction circuit automatically calculates a distribution of actual cut lengths, cut from a workpiece by a cutting machine and automatically corrects the cutting operation when the center value of the distribution of a plurality of cut lengths differs from the desired cut length by a predetermined amount.

7 Claims, 6 Drawing Figures

FIG. 4B
EXAMPLE OF DISPLAY IN STEP (12)
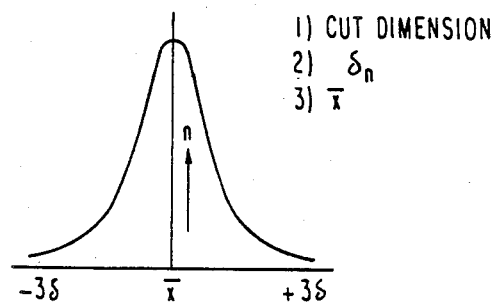
1) CUT DIMENSION
2) $\delta_n$
3) $\bar{x}$
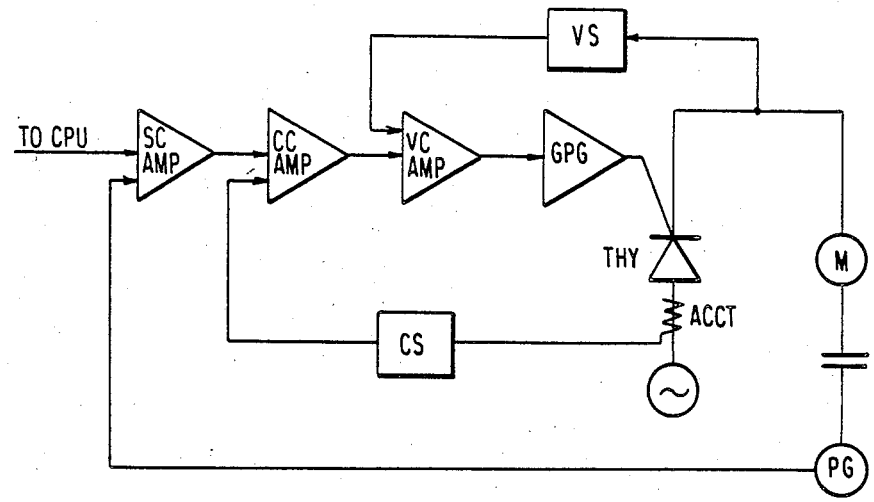
FIG. 5

CUTTER CONTROL APPARATUS

This is a continuation in part of application Ser. No. 489,292 filed 04/28/83 now abandoned.

BACKGROUND OF THE INVENTION

The present invention relates to a cutter control apparatus for controlling the position in which a workpiece is cut by a cutter, and more particularly to a cutter control apparatus having a correction device for automatically correcting the cutting position to make uniform the cut dimension of a piece cut by the cutter.

Heretofore, there has been available only a cutter control apparatus as shown in FIG. 1 of the accompanying drawings which has no correction device of the type described above. The cutter control apparatus as illustrated in FIG. 1 comprises a workpiece dimension detector 1 for detecting a dimension of a workpiece to be cut, a cut setting unit 2 for setting a reference dimension to be cut, a cutter control circuit 3 for comparing the detected dimension from the workpiece dimension detector 1 with the reference dimension setting from the cut setting unit 2 and for actuating a cutter of a cutting machine (not shown) when the dimensions compared are in agreement, a cut calculating circuit 4 for calculating the dimension of a piece actually cut by the cutting machine under the control of the center control circuit 3, and a display unit 5 for displaying the actual cut dimension as detected by the cut calculating circuit 4.

The operation of the cutter control apparatus of the foregoing construction for controlling the cutting machine will now be described. In addition, the manner of detecting and dealing with an erroneous actual cut will also be described. When the dimension as detected by the workpiece dimension detector 1 coincides with the (reference) cut dimension setting entered from the cut dimension setting unit 2, the cutter control circuit 3 actuates the cutter to cut off the workpiece to the set dimension. The actual cut dimensions however tend to disagree with the (reference) cut dimension settings, and are distributed in a certain range depending on a number of factors. The operator samples the dimensions of a plurality of cut pieces as calculated by the cut measuring circuit 4 and displayed by the display unit 5. The distribution of the actual cut dimensions is then determined by way of a statistical method, e.g. using a frequency table. If it is judged from the dimension distribution that a particular cut dimension is abnormal, then the operator corrects the control of the cutting position in the cutter control circuit 3 to avoid the production of a defective cut piece.

Therefore, upon a cutting malfunction, the corrective action in the conventional cutter control apparatus has been effected maunally by the operator. Such manual correction is disadvantageous in that a long period of time elapses after an abnormal cut has been made and before it is detected or the control is corrected. By the time the abnormal cut is detected and the control corrected, the defectively cut piece has already been delivered to downstream sections for successive steps. Accordingly, all operations done on the defective piece in the downstream sections become useless. Since defectively cut pieces are successively delivered until the abnormal cutting is detected, the rate of production of defective pieces, i.e. the ratio of defective pieces to normal pieces, is increased, thus increasing the cost of the products. Further, such defective products sometimes find their way into the hands of consumers, and the credibility of the products that took a long time to establish is damaged.

SUMMARY OF THE INVENTION

The present invention is intended to eliminate the foregoing drawbacks of conventional apparatus. It is therefore an object of the present invention to provide a cutter control apparatus having a correction device for more quickly detecting an abnormal cut made by a cutting machine, automatically correcting the cutting position control in the cutter control apparatus when the central value of the distributed (actual) cut dimensions disagrees with a reference cut dimension setting, and quickly notifying the operator of when the fraction of defective pieces exceeds an allowable fraction, whether due to abnormal cutting or other abnormal conditions.

In other words a primary object of the invention is to carry out a quality control so that the cut dimension can be made uniform by using statistical errors obtained by statistical analysis. In this case, it should be noted that the correction operation is carried out once a lot (defined by the number of cutting operations).

BRIEF DESCRIPTION OF THE DRAWINGS

FIGS. 4A and 4B illustrate a flow chart, somewhat more detailed than that of FIG. 3, showing in more detail the control operations of the CPU of FIG. 2.

FIG. 5 is a schematic diagram of an example of the circuitry contained in the Thyristor Control Circuit of FIG. 2.

DETAILED DESCRIPTION OF THE INVENTION

Figure 1:
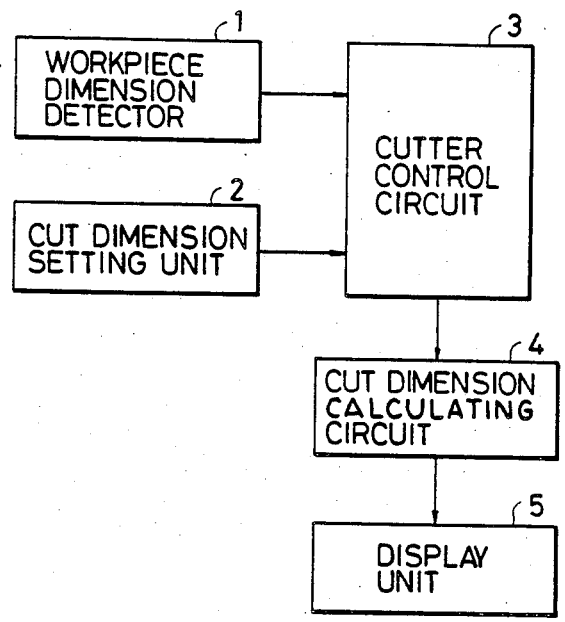
FIG. 1 is a block diagram of a conventional cutter control apparatus.
Figure 2:
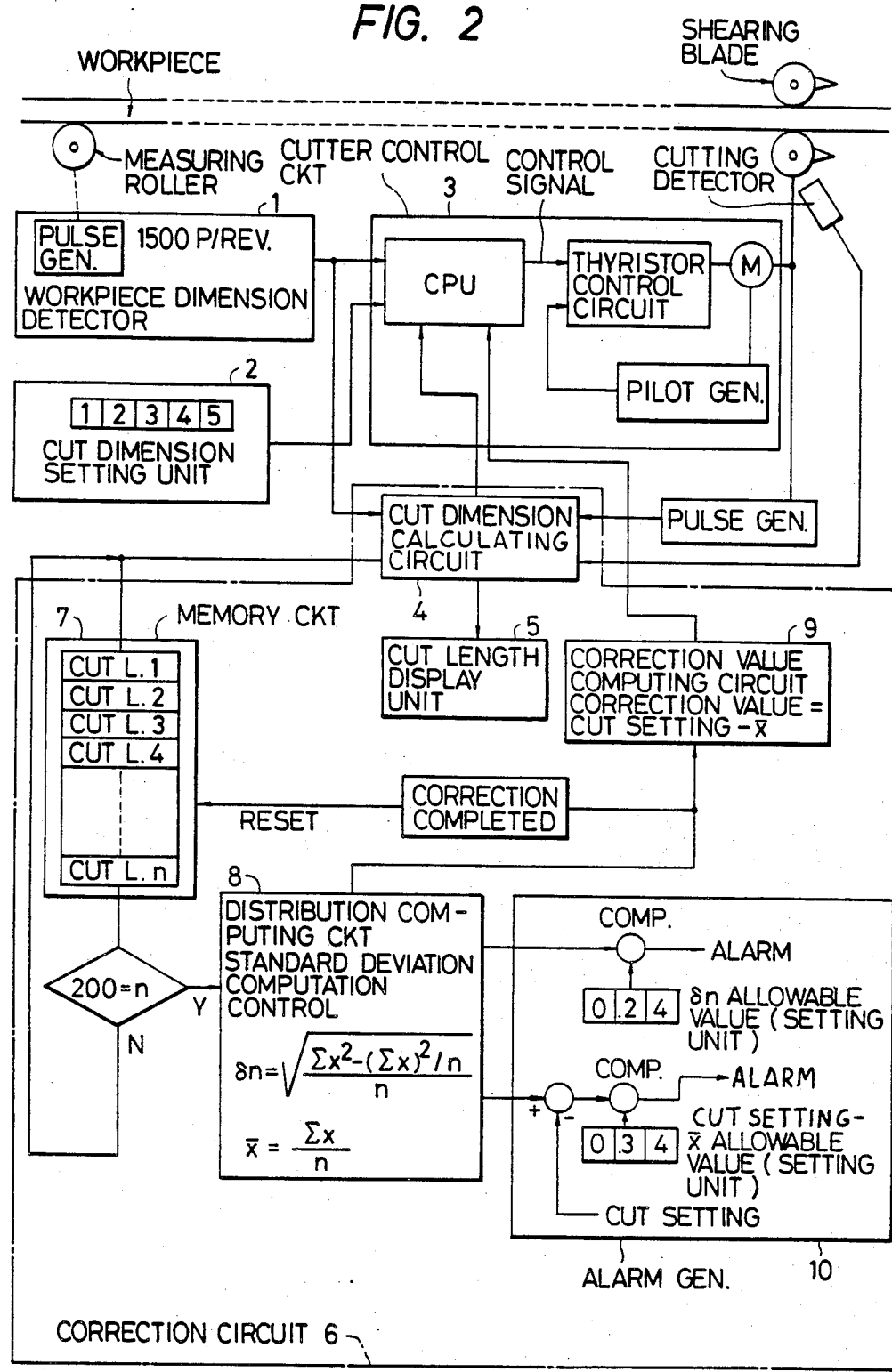
FIG. 2 is a block diagram of a cutter control apparatus according to an embodiment of the present invention.

An embodiment of the present invention will now be described with reference to FIG. 2. Identical parts in FIG. 2 are denoted by identical reference characters in FIG. 1. In FIG. 2, a correction device (circuit) 6 serves the function of determining the distribution of actual dimensions cut by a cutting machine and delivers a cutting position correction signal to the cutter control circuit 3 when the central value (mean value, for example) of the distributed dimensions deviates from a cut dimension setting. The correction device 6 also emits or displays an alarm when the fraction of defective pieces determined by the dimension distribution is greater than an allowable fraction, thereby notifying the operator of an abnormal condition.

The correction device 6 includes a cut dimension calculating circuit 4 for calculating an actual dimension of a cut made by the cutting machine, and a distribution computing circuit 8 for programmably processing the cut dimension information using a statistical method such as, e.g., a frequency table or a control chart, to determine the distribution of actual cut dimensions. The computing circuit 8 generates a center abnormal signal when the central value of the dimension distribution deviates from a cut dimension setting, and issues a signal indicative of an excessive fraction of defective pieces when the fraction of defective pieces determined from the dimension distribution is larger than an allowable fraction. The correction device 6 further comprises a correction-value computing circuit 9 responsive to the center abnormal signal for computing a correction value for a cutting position of the cutting machine and supplying a corresponding correction signal to the cutter control circuit 3, and an alarm generator 10 for generating or displaying an alarm signal in response to the signal indicative of the excessive fraction of defective pieces.

The operation of the cutter control apparatus of the foregoing construction is as follows. The cutting position of the cutting machine is controlled by the cutter control circuit 3 in the same manner as in a conventional machine. More specifically, the cutter control circuit 3 compares a workpiece dimension as detected by the workpiece dimension detector 1 with a reference dimension setting entered from the cut dimension setting unit 2, and operates a cutter or the like of the cutting machine to cut off the workpiece when the detected and set dimensions coincide with each other.

The cutter control apparatus of the invention, however, is different from the prior operator-controlled apparatus in the manner of detecting and dealing with an abnormal cut dimension. According to the present invention, actual cut dimensions are calculated by the cut dimension calculating circuit 4 and stored in a memory circuit 7. Based on the stored cut dimensions, the distribution computing circuit 8 then prepares a frequency table, for instance, to find a distribution of the actual cut dimensions. When the central value of the dimension distribution deviates from the cut dimension setting by an excessive amount, the distribution computing circuit 8 issues a center abnormal signal to the correction-value computing circuit 9. The correction-value computing circuit 9 is responsive to the center abnormal signal for computing a correction value for the cutting position, and delivering such a value as a correction signal to the cutter control circuit 3. As a result, any production of defective products due to abnormal variations in actual cut dimensions is automatically prevented.

The distribution computing circuit 8 may, for example, compare the distribution of the actual cut dimensions with a control limit in a control chart. If the fraction of defective pieces is found to exceed an allowable fraction, then the distribution computing circuit 8 issues a first indicating signal indicative of an abnormal fraction of defective pieces to the alarm generator 10. There are various possible causes for such an abnormal defective fraction, including a deviation of the distribution center from the cut dimension setting, as described above, or an extension of the distribution range beyond an allowable range of cut dimensions. However, the distribution computing circuit 8 issues the first indicating signal irrespective of the causes thereof. In response to such a signal, the alarm generator 10 produces or displays an alarm signal, letting the operator know immediately that the cutting machine has encountered an abnormal condition. Based on this first indicating signal, the operator can now ascertain whether or not correction of the cutting position is appropriate, and if necessary can shut off the cutting machine to prevent any further defective products from being produced.

Figure 3:
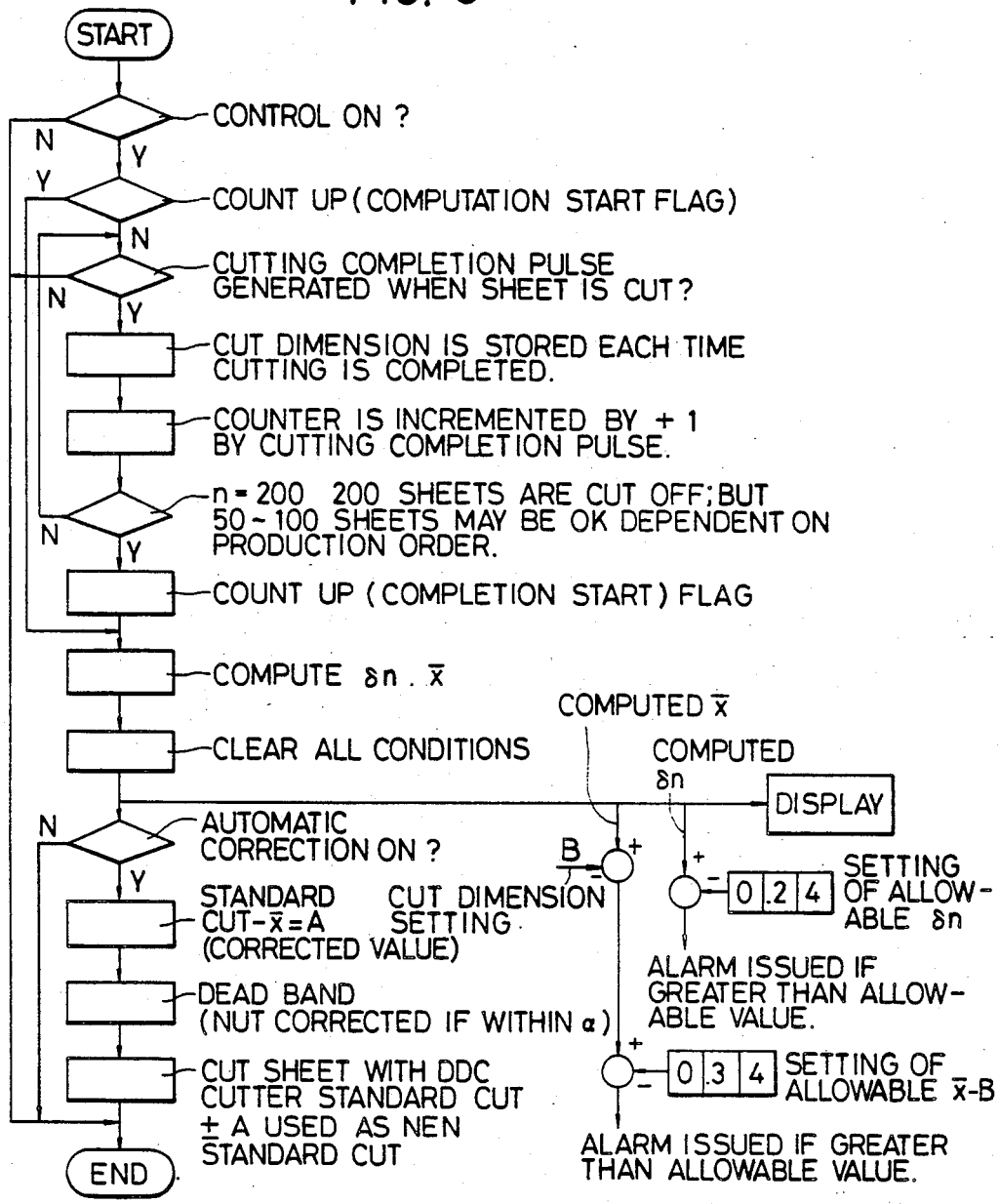
FIG. 3 is a flow chart illustrating the operation of the cutter control circuitry of FIG. 2.
Figure 4A:
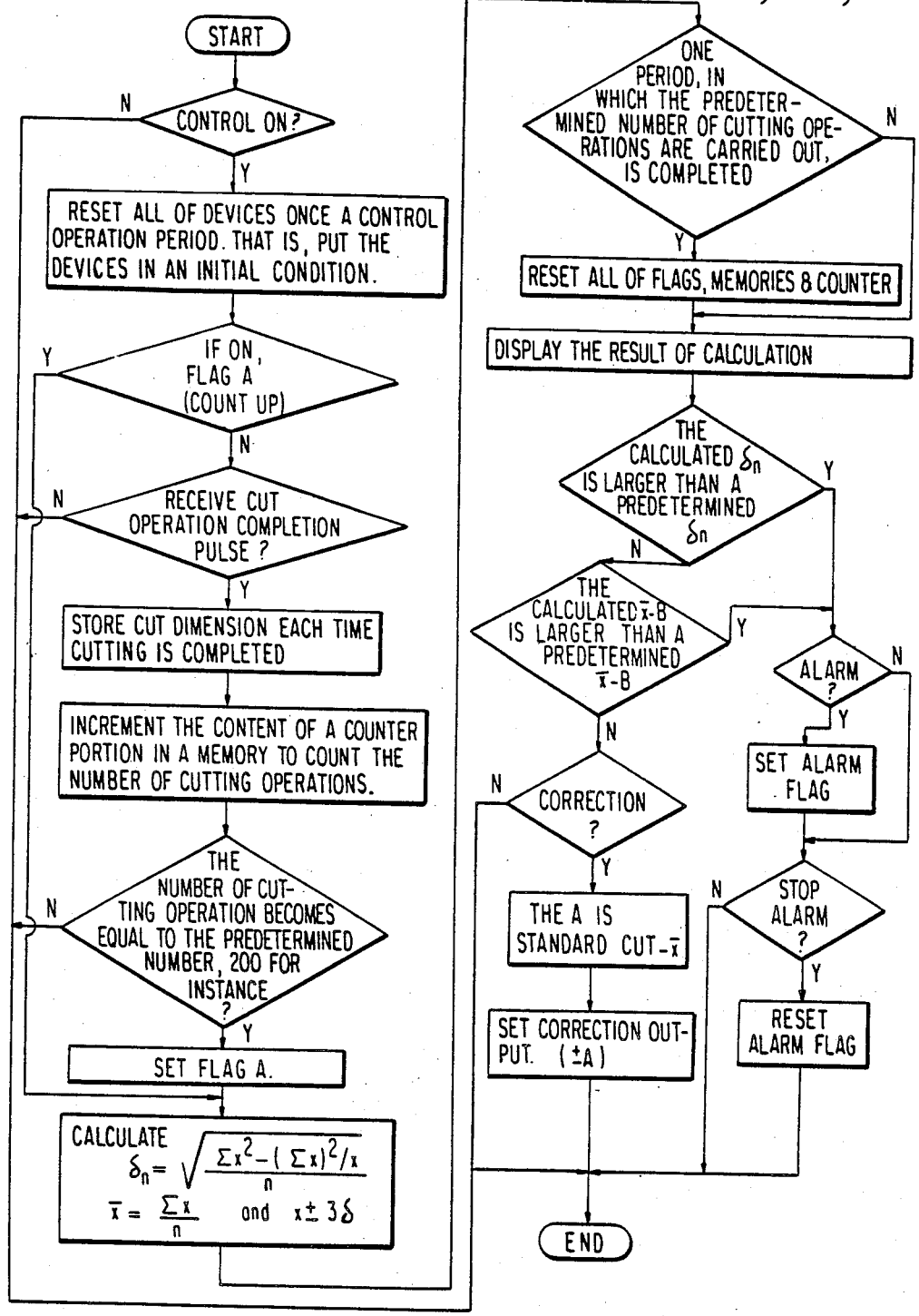

The structure and operation of FIG. 2 is now described in more detail with reference to the flow charts of FIGS. 3, 4A and 4B as follows.

(1) A workpiece dimension detector 1 operates the detect a workpiece running speed and a workpiece running length per a certain period of time by counting an output pulse signal which is produced by a pulse oscillator operable to produce 1500 output pulses per one revolution of a measuring roller, the measuring roller directly contacting the running workpiece. This output signal of the detector 1 is applied to both a cutter control circuit 3 and a cut measuring circuit 4.

(2) The cut dimension of a workpiece is manually set by an operator through a cut dimension setting unit 2.

(3) The cutter control circuit 3 comprises a CPU, a thyristor control circuit for carrying out a follow-up control in response to the output of the CPU, a shearing blade drive motor and a pilot generator.

(4) The dimension measuring circuit 4 operates to calculate the actual cut dimension of a workpiece by counting the output pulses produced by the pulse generator in the detector 1 during a period defined by the cutting operation completion pulses. Assuming that the pulse generator generates 1500 output pulses per one revolution of the measuring roller, the actual cut length is expressed as $(n/1500) \times 1$, where n is the number of pulses generated during the period and l the circumferential length of the measuring roller.

(5) The cut length display unit 5 operates to display the cut dimension in a digital mode.

(6) The memory circuit 7 is adapted to store 200 data sets, each representing the actual cut length, and to be reset at the end of the correction operation.

(7) When the 200 data sets are stored in the memory circuit 7, the computing circuit 8 starts its calculating operation.

(8) The circuit 9 operates to compute, and send to the CPU, a correction value of [predetermined (preset) value $-\bar{x}$].

(9) The alarm circuit 10 operates to generate an alarm when the computed value exceeds the limit allowance value of the $\delta_n$ and $\bar{x}$.

FIG. 5 is an illustration of the circuitry which may be contained within the Thyristor Control Circuit of FIG. 2. In FIG. 5, "SC AMP" designates a speed control amplifier operable to control the rotation speed of the drive motor M so as to coincide with that determined according to the output of the CPU. "CC AMP" designates a current control amplifier operable to control the current flowing through a main circuit. The current is detected by an AC current transformer ACCT and then converted to a DC level signal to be applied to the current control amplifier. "VC AMP" designates a voltage control amplifier operable to control a voltage appearing at the main circuit. The voltage is detected and converted to a control level signal by a voltage sensor VS. "GPG" designates a gate pulse generator operable to receive the output of the VC amplifier to carry out the gate phase control to thereby control the drive motor M.

Thus, it is seen that the invention provides the following advantages:

(1) The calculation results are automatically displayed in a display device so that an operator can visually judge whether or not a correction operation is required.

(2) Provided that allowable limits of $\delta_n$ and $\bar{x}$ have been preset by the operator, an alarm is able to be produced automatically.

(3) A correction operation is not carried out for each cutting operation, but, rather, a correction operation is carried out for each production lot in which the predetermined number of cutting operations is accomplished. If no correction is required, a control inhibiting signal can be easily issued in the first control step (1) of the flow chart (FIG. 4A).

Thus in accordance with the invention, an actual cut dimension can be easily controlled statistically.

While in the illustrated embodiment the cutter control apparatus has a correction device, other control apparatus such as a compressor control apparatus or a machining device control apparatus may be equipped with such a correction device. The display unit 5 may comprise a dot matrix display unit, a CRT monitor display unit, or a computer display unit.

As described above, the cutter control apparatus of the present invention includes, in addition to a conventional cutter control apparatus, a correction device for quickly detecting an abnormal cut made by a cutting machine, for automatically correcting a deviation from a cut dimension setting, and for notifying the operator of an increased fraction of defective pieces due to any abnormal conditions, including an incorrect dimensional cut. With this arrangement, the defective fraction can be reduced, and defective products can be prevented from passing to downstream sections for successive steps. Accordingly, the working efficiency will not be decreased, and the cost of manufacture of products is reduced.

What is claimed is:

1. In a cutter control apparatus for a cutting machine, said machine being of the type having cutting means for cutting a piece from an object to be cut, cutter control circuit means operable for controlling said cutting means to cut pieces of desired length from said object, first measuring means for measuring the length of a portion of said object and for providing an output, setting means for providing a set output indicating said desired length, said cutter control circuit means being responsive to the outputs of said first measuring means and said setting means for controlling the operation of said cutting means, cut dimension calculating circuit means, coupled to said control circuit means, for calculating the actual cut lengths of pieces cut from said object, and display means, coupled to said cut dimension calculating circuit means, for displaying said actual cut lengths; the improvement comprising:

correction circuit means, coupled to said cutter control circuit means and to said cut dimension calculating circuit means, for automatically correcting said cutter control circuit means by automatically delivering thereto a cutting position correction signal when the center value of a distribution of a plurality of said actual cut lengths disagrees with said set output indicating said desired length.

2. A cutter control apparatus as claimed in claim 1, wherein said correction circuit means comprises: memory circuit means, coupled to said calculating circuit means, for storing said plurality of said actual cut lengths; distribution computing means, coupled to said memory circuit means, for computing said distribution of the stored actual cut lengths; and correction-value computing means, coupled between said distribution computing means and said cutter control circuit means, for comparing the center value of said distribution with said desired length and for producing said correction signal which is delivered to said cutter control circuit means.

3. A cutter control apparatus as claimed in claim 2, wherein said correction-value computing means produces said correction signal having a value proportional to the difference between said desired length and said center distribution value.

4. A cutter control apparatus as claimed in claim 3, wherein said correction circuit means corrects said cutter control circuit means only if the value of said correction signal exceeds a predetermined value.

5. A cutter control apparatus as claimed in claim 2, wherein said distribution computing means computes said distribution only after a predetermined number of length values are stored in said memory circuit means.

6. A cutter control apparatus as claimed in claim 2, further comprising abnormal fraction alarm means responsive to the computed distribution for generating an abnormal fraction alarm when the number of incorrectly cut pieces exceeds a predetermined fraction of the pieces cut by said machine.

7. A cutter control apparatus as claimed in claim 2, further comprising center abnormal alarm means for generating a center abnormal alarm when the center value of said distribution differs from said desired length by a predetermined amount.

* * * * *